United States Patent [19]

Sonderegger et al.

[11] Patent Number: 4,552,332

[45] Date of Patent: Nov. 12, 1985

[54] BUTTERFLY VALVE, ESPECIALLY FOR DEAD-END SERVICE

[75] Inventors: Henry R. Sonderegger, Barrington; Charles Chatterley, Coventry, both of R.I.

[73] Assignee: ITT Corporation, New York, N.Y.

[21] Appl. No.: 624,865

[22] Filed: Jun. 27, 1984

[51] Int. Cl.[4] .............................................. F16K 51/00
[52] U.S. Cl. ................................... 251/148; 251/306; 277/47; 277/166; 277/178
[58] Field of Search ............. 251/148, 152, 179, 192, 251/214, 299, 305, 306, 307, 361, 367; 137/315, 454.2; 277/47, 48, 49, 178, 166

[56] References Cited

U.S. PATENT DOCUMENTS

| | | | |
|---|---|---|---|
| 3,540,691 | 11/1970 | Snell, Jr. | 251/151 |
| 3,656,714 | 4/1972 | Peterson | 251/151 |
| 3,782,684 | 1/1974 | Stephens et al. | 251/306 |
| 4,101,112 | 7/1978 | Conners et al. | 251/305 |
| 4,176,820 | 12/1979 | Broadway | 251/306 |
| 4,306,706 | 12/1981 | Olansen et al. | 251/306 |

Primary Examiner—Martin P. Schwadron
Assistant Examiner—Sheri M. Novack
Attorney, Agent, or Firm—John T. O'Halloran; Peter R. Ruzek

[57] ABSTRACT

The sealing element of a butterfly valve includes a rigid support ring, and an elastically yieldable sealing ring which partially embeds the support ring within itself. The sealing ring has an inner portion which is juxtaposed with the inner periphery of the support ring, and two end portions which emerge with the inner portion and extend therefrom in the radially outward direction in juxtaposition with respective axial end faces of the support ring. At least one of the end portions of the sealing ring terminates before it reaches the outer peripheral surface of the support ring, so that it exposes an annular zone of one of the axial end faces of the support ring. An annular, circumferentially complete, projection of the valve body extends into the passage at the downstream end thereof as considered in the direction of fluid flow through the passage in the fully open position of the valve member. The exposed zone of the one axial end face of the support ring of the sealing element then abuts against this annular projection to detain the support ring and thus the entire sealing element in position against displacement in the axially downstream direction under the action of the fluid pressure on the sealing element. The upstream end portion of the sealing ring is clamped between the thus detained support ring and a holding member mounted on the valve body, to provide a sealing effect at this region.

7 Claims, 4 Drawing Figures

BUTTERFLY VALVE, ESPECIALLY FOR DEAD-END SERVICE

BACKGROUND OF THE INVENTION

The present invention relates to butterfly valves in general, and more particularly to a butterfly valve which is especially suited for use in dead-end service.

There are already known various constructions of butterfly valves which usually include a valve housing or body that bounds a passage, a disc-shaped valve member which is received in the passage and mounted for turning about an axis extending transversely of the passage, and an annular sealing element extending around the passage and sealing the gap between the valve body and the valve member in the closed position of the latter.

There have also been developed so called insert or cartridge-type butterfly valves in which the valve body is substantially annular and is inserted between the flanges of two consecutive pipe sections when in use. Examples of butterfly valves of this type are shown in U.S. Pat. Nos. 3,540,691; 3,656,714; 3,782,684; and 4,101,112. These patents show that it is known to construct the sealing element of two different materials, that is, a relatively rigid material which constitutes a support ring, and an elastically yieldable material in the form of a sealing ring which at least partially embeds the support ring. In each instance, however, the material of the sealing ring covers at least the inner peripheral surface of the support ring, and its two axial faces in their entirety. The reasons for this should be easy to appreciate. The portion which covers the inner peripheral surface of the support ring is in a sealing contact with the periphery of the disc shaped valve member around the entire periphery of the passage in the closed position of the valve member. On the other hand, the portions of the annular sealing ring which cover the axial end faces of the support ring provide for a sealing contact with the flanges of the consecutive pipe sections upon incorporation of the cartridge-type butterfly valve in a pipeline, thus preventing leakage externally and past the sealing element in the closed position of the valve member.

As advantageous as the construction and operation of these butterfly valves may be when they are interposed between two consecutive pipe sections, experience has shown that they suffer of a serious drawback when it is attempted to use them in dead-end service, that is, at the free end of a pipe or a similar tubular element. In this case, the axial forces acting on the sealing element and on the disc-shaped valve member in its closed position due to the pressure of the fluid thereon will be resisted only by the stem mounting the valve member in the passage. The stem will have to accept and withstand not only the forces resulting from the pressure of the fluid on the valve member itself, but also those which act on the sealing element in the axial direction and press the same against the stem. It was established that, under these circumstances, there is a pronounced danger that the stem could bend or, even if it does not, that the sealing element could be displaced by the pressure of the fluid thereon in the downstream direction to an extent sufficient for leakage to occur either outwardly past the sealing element, or through a leakage path coming into existance between the inner periphery of the sealing element and the outer periphery of the valve member in the thus axially displaced position of the sealing element. In the above-listed patents, this problem exists even though the sealing element is in contact with portions of the valve housing or body or other elements which have a reduced diameter with respect to the remainder of the passage, in that the elastically yieldable portions of the sealing element are in such contact.

SUMMARY OF THE INVENTION

Accordingly, it is a general object of the present invention to avoid the disadvantages of the prior art.

More particularly it is an object of the present invention to develop a butterfly valve which does not possess the above-discussed disadvantages of the conventional butterfly valves of this type.

Still another object of the present invention is so to construct the butterfly valve of the present invention as to avoid leakage therethrough even when the valve is used in dead-end service.

It is yet another object of the present invention so to design the valve of the type here under consideration as to be particularly suited for use in such dead-end service.

A concomitant object of the present invention is to devise a valve of the above type which is simple in construction, inexpensive to manufacture, easy to install and use, and reliable in operation nevertheless.

According to the present invention, there is provided a butterfly valve which comprises a valve body bounding a passage centered on an axis and having two axially spaced end portions and an intermediate region therebetween the valve body having at least one detaining projection extending radially inwardly into passage at one of the end portions of the latter; a disc-shaped valve member mounted in the valve body for turning about a pivot axis extending transversely of the passage between a closing position in which the valve member extends across the passage at the intermediate region, and a fully open position in which the valve member extends substantially along the axis of the passage, through a plurality of partially open positions; and means for sealing the valve member in the passage, including an annular sealing element extending around the axis of the passage, the sealing element including a support ring having two oppositely facing axial faces, one of which faces toward the detaining projection, and an outer circumferential surface of an outline substantially corresponding to the cross-sectional shape of the passage at the intermediate region, and an elastically yieldable sealing ring at least partially embedding the support ring but exposing at least a zone of the one axial face of the support ring which is substantially coextensive with the detaining projection of the valve body for the zone to abut the projection, the sealing means further including at least one rigid holding member connected to the valve body and having an axial contact surface which faces the sealing element and sealingly contacts the sealing ring at a circumferentially complete region thereof which is juxtaposed with the other of the axial faces of the support ring.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENT

Figure 1:
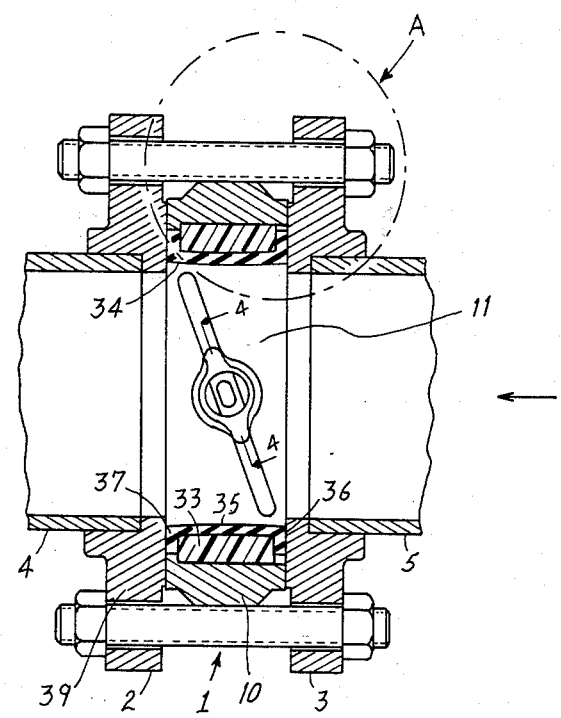
FIG. 1 is longitudinal sectional view through a butterfly valve embodying the present invention, as used between two consecutive pipe sections.

Referring now to the drawing in detail, and first FIG. 1 thereof it may be seen that the reference numeral 1 has been used in to identify a butterfly valve constructed in accordance with the present invention in its entirety. The butterfly valve 1 is shown in FIG. 1 to be interposed between flanges 2 and 3 of consecutive pipe sections 4 and 5. However, it will be appreciated from the following description that, while it is possible to use the butterfly valve 1 of the present invention in this application, the construction of the butterfly valve 1 of the present invention is such that it is particularly suited for use in dead-end service, that is, where the flange 2 and the corresponding pipe section 4 are absent.

The basic construction of the butterfly valve 1 and its components, will now be discussed in conjunction with FIG. 2 of the drawing. It may be seen that the butterfly valve 1 includes, as one of its main components, a valve housing or body 10 which is shown to be of a substantially annular configuration. The valve body 10 circumferentially bounds a through passage 11 in which there is accommodated an annular sealing element 12. The valve body 10 includes two aligned bores 13 and 14 which are centered on an axis extending transversely of the passage 11 substantially centrally of the latter. Similarly, the sealing element 12 has respective openings 15 and 16 which are centered on the same turning axis upon insertion of the sealing element 12 in the proper orientation into the passage 11. Finally, a disc-shaped valve member 17 is provided with a receiving recess 18 in an enlarged formation 19, and with another receiving recess (not shown) in an enlarged portion 20 of the valve member 17. This latter recess is centered on a common axis with the recess 18, this axis extending substantially centrally through the valve member and coinciding with the above-mentioned turning axis upon assembly of the valve member 17 with the remainder of the butterfly valve 1. An actuating shaft 21, turnably supported in bearings 22 and 23 upon assembly valve body 10, and having a peripheral groove 24, has an end portion 25 of a non-circular configuration compatible with the substantially complementary non-circular configuration of the recess 18, and received in the recess 18 upon assembly. Obviously, the actuating shaft 21 passes through the bore 13 of the valve body 10 and through the opening 15 of the sealing element 15 to reach the recess 18, and is accesible from the exterior of the valve body 10 for turning the same as desired to control the flow of fluid through the valve 1.

Similarly, a stub shaft 26 having a peripheral groove 27 passes through the wall 14 of the valve body 10 and through the opening 16 of the sealing element 16 so that its tapering end portion 28 reaches into the recess of the formation 20 of the valve member 17. In this manner, the valve member 17 is mounted on the valve body 10 for turning about the aforementioned turning axis that coincides with the central axis of the valve member 17. The shafts 21 and 26 are retained in the respective bores 13 and 14 against axial movement by retention pins 29 and 30 which are received in corresponding bores 31 and 32 and are partially accommodated in the respective grooves 24 and 27.

Figure 2:
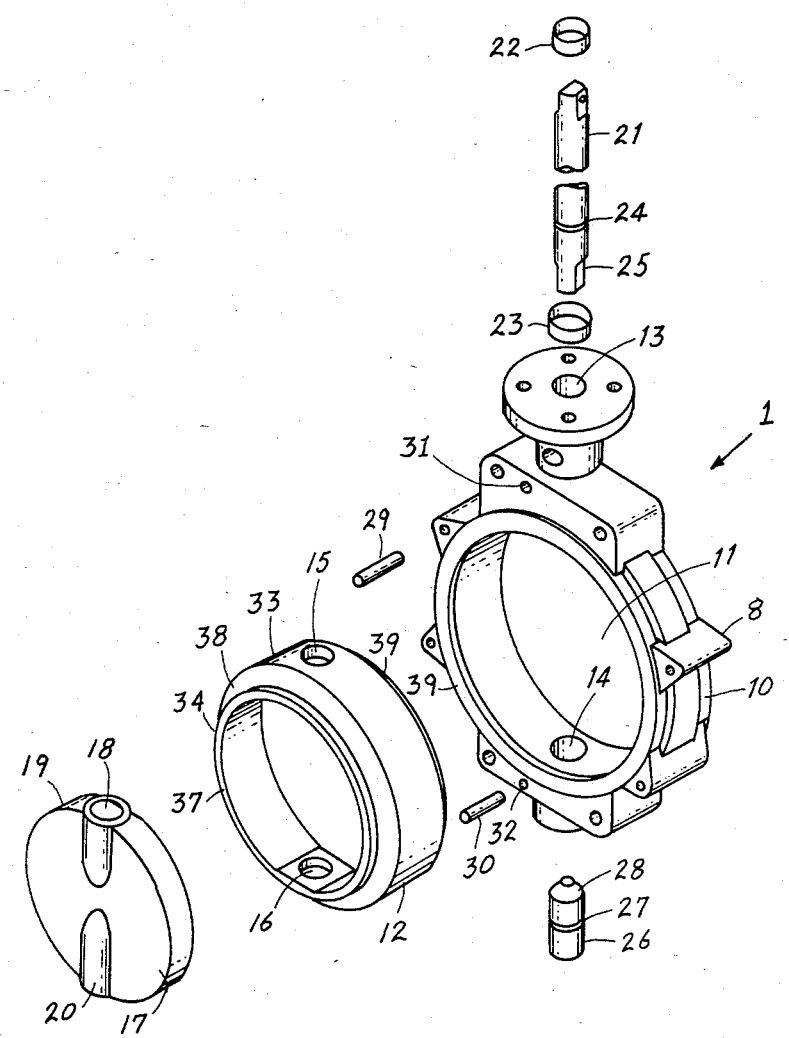
FIG. 2 is an exploded view of the butterfly valve according to the present invention especially for use in dead-end service.

As a comparison of FIGS. 1 and 2 will reveal, the sealing element 12 includes a reinforcing or support ring 33 and a sealing ring 34 which embraces and partially covers, if not embeds, the support ring 33. The sealing ring 34 has a central portion 35 which is juxtaposed with the inner periphery of the support ring 33, and two end portions 36 and 37 which integrally merge with the central portion 35 and extend therefrom in the outward direction along the respective axial end faces of the support ring 33. At least the end portion 37 terminates short of reaching the outer periphery of the support ring 33, but the end portion 36 may do the same, as indicated in FIG. 1, or may extend all the way to the outer periphery of the support ring 33, as illustrated in FIG. 2.

The end portion 37 of the sealing ring 34, by stopping short of the outer periphery of the support ring 33, exposes an annular zone 38 of the associated axial end face of the support ring 33. Then, the annular valve body 10 is provided, at the downstream end of the passage 11 as considered in the direction of flow of the fluid indicated by an arrow in FIG. 1, with a circumferentially extending ridge, lip, rib or similar projection 39 which is to serve as a detaining abutment for the support ring 33 and thus for the sealing element 12 as a whole.

Figure 3:
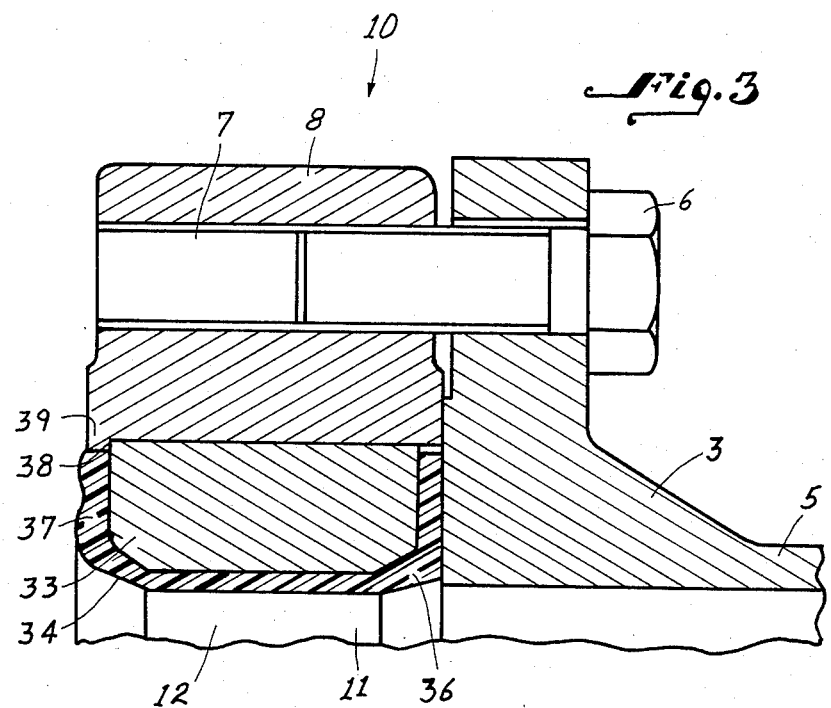
FIG. 3 is an enlarged sectional view substantially corresponding to detail A of FIG. 1, but where the valve is constructed for use in dead-end service.

Further details of this arrangement can be ascertained from FIG. 3, where it is shown that the zone 38 of the support ring 33 is in contact with the projection 39 of valve body 10, and that the end portion 37 of the sealing ring 34 terminates at such a radial outward distance that it is close to or in contact with the inner peripheral surface of the projection 39.

Figure 4:
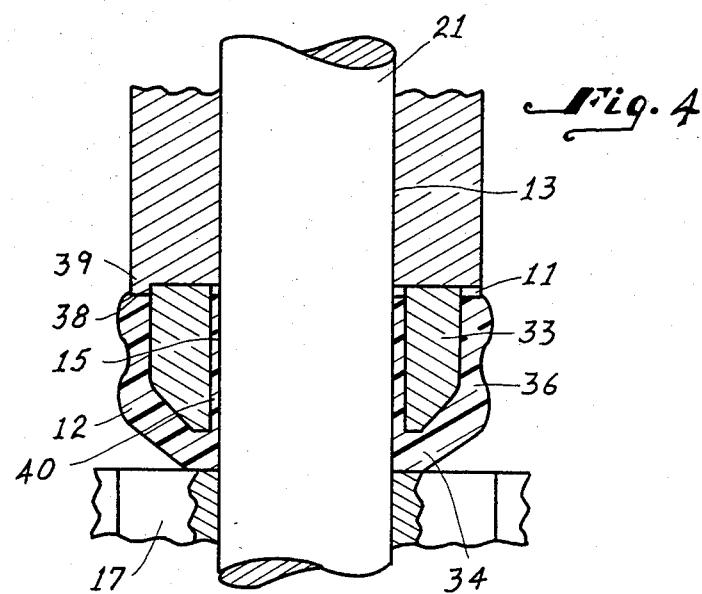
FIG. 4 is an enlarged fragmentary sectional view taken along the lines 4—4 of FIG. 1.

FIG. 3 also shows that the flange 3, which in this case is shown to be integral with the pipe section 5, can be used as a holding member for the sealing element 12. To this end, it is connected, by screws 6 threaded into appropriate threaded bores 7 provided in respective lugs 8 of the valve body 10, to the valve body 10 for displacement relative thereto in the axial direction during the assembly therewith. As depicted in FIG. 4, the end portion 36 is so configurated that, in its relaxed state, it extends axially beyond the upstream end of the passage 11. Hence, turning back to FIG. 3, as the screws 6 are being tightened during the assembly of the flange 3 with the housing 10, the end portion 36 is confined between the flange 3 and the support ring 33 and deformed until it forms an essentially leak-proof seal. At the same time, the projection 39 prevents the support ring 33 from being displaced axially in the downstream direction which means not only that the support ring 33 will cooperate in the aforementioned deformation of the end portion 36, but also that the pressure of the flange 3 against the end portion 36 will firmly press the zone 38 against the projection 39. Thus, the support 33 will retain its position in the passage 11, and, consequently, no additional stresses will be transferred from the sealing element 12 to any of the shafts 21 and 26.

It may be seen in FIG. 4 that the actuating shaft 21 passes, without clearance, through the bore 13, whereupon it enters the opening 15 which is provided with an elastically yieldable lining 40 which constitutes a part of the sealing ring 34. Now, this lining 40 serves as a cushion which reduces the likihood of force transmission between the support ring 33 and the shaft 21. However, it will be appreciated that, because the projection 39 prevents the support ring 33 from displacement in the downstream direction, the upstream part of the support ring 33 will, by the same token, be prevented from coming any closer to the shaft 21 in the closed position of the valve member 17 than it is in its open position, so that the pressure acting on the sealing element 12 will not be transmitted to the shaft 21. The same is also applicable to the stub shaft 26.

The butterfly valve 1 according to the present invention is especially designed in use in dead-end service; however, it will be appreciated that the presence of the projection 39 in the passage 11 of the valve housing 10, and the exposure of the zone 38 of the support ring 33 to abut against the projection 39, is not detrimental to the use of the butterfly valve 10 between pipe sections in the manner shown in FIG. 1 so that, in order to reduce the number of different valve models and spare parts therefor, the butterfly valve 10 constructed in accordance with the present invention may be used for both kinds of services.

While we have described above the principles of our invention in connection with specific apparatus, it is to be clearly understood that this description is made only by way of example and not as a limitation to the scope of our invention as set forth in the objects thereof and in the accompanying claims.

We claim:

1. A butterfly valve, comprising
a valve body bounding a passage centered on an axis and having two axially spaced end portions and an intermediate region therebetween, said valve body having at least one detaining projection extending radially inwardly into said passage at one of said end portions;
a disc-shaped valve member mounted in said valve body for turning about a turning axis extending transversely of said passage between a closing position in which said valve member extends across said passage at said intermediate region, and a fully open position in which said valve member extends substantially along said axis of said passage, through a plurality of partially open positions; and
means for sealing said valve member in said passage, including an annular sealing element extending around said axis of said passage, said sealing element including a support ring having two oppositely facing axial faces one of which faces toward said detaining projection and an outer circumferential surface of an outline substantially corresponding to the cross-sectional shape of said passage at said intermediate region, and an elastically yieldable sealing ring at least partially embedding said support ring but exposing at least a zone of said one axial face of said support ring which is substantially coextensive with said detaining projection of said valve body for said zone to abut said projection, said sealing means further including at least one rigid holding member connected to said valve body and having an axial contact surface which faces said sealing element and sealingly contacts said sealing ring at a circumferentially complete region thereof which is juxtaposed with the other of said axial faces of said support ring.

2. The butterfly valve as defined in claim 1, wherein said projection is configured as a rib extending in the circumferential direction of said passage.

3. The butterfly valve as defined in claim 2, wherein said rib is circumferentially complete.

4. The butterfly valve as defined in claim 3, wherein said sealing ring further exposes an annular zone of said other axial face of said support ring coextensive with said zone of said one axial face.

5. The butterfly valve as defined in claim 1, wherein said sealing element extends over the entire axial length of said passage and said sealing ring projects axially beyond said passage at least at the other end portion prior to the assembly of said holding member with said valve body to be compressed between said holding member and said other axial face of said support ring upon assembly and urge said sealing element toward the abutment of said zone of said one axial face of said support ring with said detaining projection.

6. The butterfly valve as defined in claim 1 for use in dead-end service, wherein said holding member is configured as a flange; and further comprising means for connecting said flange to said valve body for axial movement toward and into contact with said sealing ring at said circumferentially complete region during the assembly of said flange with said valve body.

7. The butterfly valve as defined in claim 1, wherein said one end of said passage is the downstream end as considered in the direction of fluid flow through said passage in said fully open position of said valve member.

* * * * *